United States Patent
Park et al.

(10) Patent No.: US 9,150,106 B2
(45) Date of Patent: Oct. 6, 2015

(54) VEHICLE OPERATING SYSTEM AND METHOD OF CONTROLLING THE SAME

(75) Inventors: Seong-Joon Park, Yongin-si (KR); Ri-A Ju, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 415 days.

(21) Appl. No.: 13/612,926

(22) Filed: Sep. 13, 2012

(65) Prior Publication Data

US 2013/0249277 A1 Sep. 26, 2013

(30) Foreign Application Priority Data

Mar. 23, 2012 (KR) .......................... 10-2012-0030235

(51) Int. Cl.
*H02J 7/00* (2006.01)
*B60L 1/00* (2006.01)
(Continued)

(52) U.S. Cl.
CPC ............... *B60L 1/003* (2013.01); *B60L 3/0046* (2013.01); *B60L 3/04* (2013.01); *B60L 11/126* (2013.01); *B60L 11/1861* (2013.01); *B60L 11/1874* (2013.01); *H01M 10/48* (2013.01); *H01M 10/486* (2013.01); *H01M 10/613* (2015.04); *H01M 10/625* (2015.04); *H01M 10/6563* (2015.04); *B60L 2210/30* (2013.01); *B60L 2240/421* (2013.01); *B60L 2240/545* (2013.01); *B60L 2260/44* (2013.01); *H01M 2010/4271* (2013.01); *H01M 2220/20* (2013.01); *Y02T 10/6217* (2013.01); *Y02T 10/642* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01)

(58) Field of Classification Search
CPC . H01M 10/50; H01M 10/5004; B06L 11/187; B06L 11/1874
USPC .......................................... 320/104, 150–154
See application file for complete search history.

(56) References Cited

U.S. PATENT DOCUMENTS

| | | | | |
|---|---|---|---|---|
| 5,656,916 | A * | 8/1997 | Hotta ............................ | 320/160 |
| 6,294,843 | B1 * | 9/2001 | Kato et al. .................. | 290/40 C |
| 2005/0028542 | A1 * | 2/2005 | Yoshida et al. ................. | 62/186 |
| 2006/0080986 | A1 * | 4/2006 | Inoue ........................... | 62/259.2 |
| 2007/0298315 | A1 * | 12/2007 | Yamamoto et al. ............. | 429/62 |
| 2009/0195217 | A1 * | 8/2009 | Choi et al. .................... | 320/152 |

FOREIGN PATENT DOCUMENTS

| | | |
|---|---|---|
| JP | 05-252606 A | 9/1993 |
| JP | 06-113404 A | 4/1994 |

(Continued)

OTHER PUBLICATIONS

Korean Office Action dated Aug. 9, 2013.

*Primary Examiner* — Paul Dinh
(74) *Attorney, Agent, or Firm* — Lee & Morse, P.C.

(57) ABSTRACT

A vehicle operating system and a method of controlling the vehicle operating system, the vehicle operating system including an electric power generation module that is configured to generate electric power; a battery, the battery being chargeable by using the electric power generated by the electric power generation module; a battery management system that controls the chargeable battery; and a cooler that is configured to cool the battery, wherein the battery management system is configured to cut off the electric power supplied to the battery when the battery is fully charged, and when the battery management system cuts off the electric power supplied to the battery, the cooler is configured to consume the electric power generated by the electric power generation module.

20 Claims, 8 Drawing Sheets

(51) Int. Cl.
*H01M 10/48* (2006.01)
*B60L 3/00* (2006.01)
*B60L 3/04* (2006.01)
*B60L 11/12* (2006.01)
*B60L 11/18* (2006.01)
*H01M 10/625* (2014.01)
*H01M 10/6563* (2014.01)
*H01M 10/613* (2014.01)
*H01M 10/42* (2006.01)

(56) References Cited

FOREIGN PATENT DOCUMENTS

| | | |
|---|---|---|
| JP | 11-069510 A | 3/1999 |
| JP | 2004-280449 A | 10/2004 |
| JP | 2010-233360 A | 10/2010 |
| JP | 2011-023301 A | 2/2011 |
| KR | 1998-0058699 U | 10/1998 |

* cited by examiner

VEHICLE OPERATING SYSTEM AND METHOD OF CONTROLLING THE SAME

CROSS-REFERENCE TO RELATED APPLICATION

Korean Patent Application No. 10-2012-0030235, filed on Mar. 23, 2012, in the Korean Intellectual Property Office, and entitled, "Vehicle Operating System and Method of Controlling Same," is incorporated by reference herein in its entirety.

BACKGROUND

1. Field

Embodiments relate to a vehicle operating system and a method of controlling the same.

2. Description of the Related Art

Unlike primary batteries that are unable to be recharged, secondary batteries may be recharged. Secondary batteries may be used in a single battery form and in a battery module form (in which a plurality of batteries are connected to each other and bound in one unit) according to types of external devices to which the secondary batteries are to be applied.

A lead battery has been used as a power supply for starting engines of vehicles. Recently, an Idle Stop & Go (ISG) system to improve gas mileage has been considered. A power supply that supports the ISG system, e.g., an idling stop device, may have a power characteristic for outputting high power for starting an engine.

SUMMARY

Embodiments are directed to a vehicle operating system and a method of controlling the same.

The embodiments may be realized by providing a vehicle operating system including an electric power generation module that is configured to generate electric power; a battery, the battery being chargeable by using the electric power generated by the electric power generation module; a battery management system that controls the chargeable battery; and a cooler that is configured to cool the battery, wherein the battery management system is configured to cut off the electric power supplied to the battery when the battery is fully charged, and when the battery management system cuts off the electric power supplied to the battery, the cooler is configured to consume the electric power generated by the electric power generation module.

The vehicle operating system may further include a main controller that receives data related to a charge state of the battery from the battery management system and that controls the cooler based on the received data.

When the main controller receives data indicating a full charge state from the battery management system, the main controller may be configured to generate a control signal for controlling the cooler based on the received data.

The cooler may include a fan that cools the battery, and a fan controller that controls driving of the fan, and the fan controller may be configured to adjust a rotating speed of the fan based on the control signal.

The fan controller may be configured to rotate the fan to consume all the electric power generated by the electric power generation module.

The main controller may receive data related to the charge state of the battery from the battery management system and may be configured to generate a control signal for starting driving of the cooler when the charge state is greater than a reference value.

The cooler may include a fan that cools the battery, and a fan controller that controls driving of the fan, and the fan controller may be configured to adjust a rotating speed of the fan based on the control signal.

Charging the battery and driving the cooler may be simultaneously performed by using the electric power generated by the electric power generation module, when the charge state of the battery is greater than the reference value and the battery is not yet fully charged.

The data related to the charge state of the battery may be data indicating a voltage of the battery.

The main controller may estimate a temperature of the battery from the data indicating the voltage of the battery and controls the cooler based on the estimated temperature.

The battery management system may directly transmit data indicating a charge state of the battery to the cooler.

The cooler may include a fan that cools the battery, and a fan controller that controls driving of the fan, and the fan controller may be configured to adjust a rotating speed of the fan based on the data.

The fan controller may be configured to rotate the fan to consume all the electric power generated by the electric power generation module when the fan controller receives data indicating a full charge state from the battery management system.

Driving of the cooler may begin when the charge state is greater than a reference value.

Charging the battery and driving the cooler may be simultaneously performed by using the electric power generated by the electric power generation module, when the charge state of the battery is greater than the reference value and the battery is not yet fully charged.

The data indicating the charge state of the battery may be data indicating a voltage of the battery.

The cooler may be configured to estimate a temperature of the battery from the data indicating the voltage of the battery and may be configured to control the cooler based on the estimated temperature.

The embodiments may also be realized by providing a method of controlling a vehicle operating system, the method including charging a battery by using electric power generated by an electric power generation module; determining a charge state of the battery; determining whether the battery is fully charged; cutting off the electric power supplied to the battery when the battery is fully charged; and consuming at least some of the electric power generated by the electric power generation module via a cooler that cools the battery when the charge state of the battery is greater than a reference value.

When the battery is fully charged, the cooler may consume all the electric power generated by the electric power generation module.

Determining the charge state of the battery may include measuring a voltage of the battery, and when the charge state of the battery is greater than the reference value, a controller may allocate an amount of electric power used to charge the battery and another amount of electric power used by the cooler from among the electric power generated by the electric power generation module based on the voltage of the battery.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

As used herein, the term "and/or" may include any and all combinations of one or more of the associated listed items. Expressions such as "at least one of," when preceding a list of elements, modify the entire list of elements and do not modify the individual elements of the list.

The terminology used in the application is used only to describe specific embodiments and does not have any intention to limit the embodiments. An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

Figure 1:
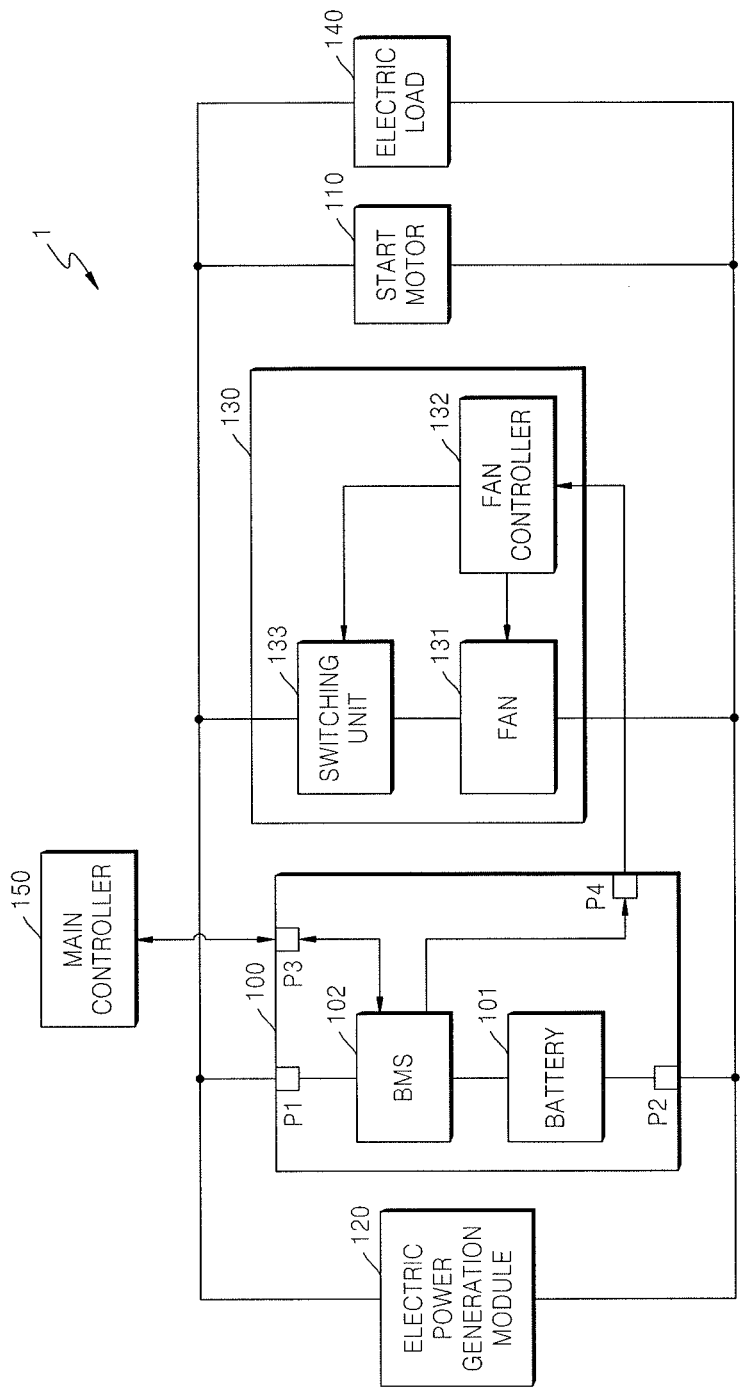
FIG. 1 illustrates a block diagram of a vehicle operating system according to an embodiment.

FIG. 1 illustrates a block diagram of a vehicle operating system according to an embodiment. A vehicle to which the vehicle operating system is applied 1 may include, e.g., an automobile or an electric bicycle.

Referring to FIG. 1, the vehicle operating system 1 may include a battery pack 100, a start motor 110, an electric power generation module 120, a cooler 130, and a main controller 150. An electric load 140 may be connected to the vehicle operating system 1.

The battery pack 100 may store electric energy by receiving a current generated by the electric power generation module 120 and may supply a driving current to the start motor 110. The battery pack 100 may also supply stored electric power as operating power for control units, e.g., a Battery Management System (BMS) 102, a fan controller 132, and the main controller 150, to be described in greater detail below. The battery pack 100 may include a battery 101 and the BMS 102.

The battery 101 may be a rechargeable secondary battery and may be configured with one or more serial-connected and/or parallel-connected battery cells. For example, the battery 101 may be a lithium ion battery.

The battery pack 100 may be applied to a power supply for starting an engine in an Idle Stop & Go (ISG) system in which an ISG function is implemented to improve gas mileage. In response to frequently repeated stopping and restarting of the engine in the ISG system, charging and discharging of the battery pack 100 may also be repeated.

For a lead battery in one type of ISG system, when a charge and discharge operation is frequently repeated, a life span of the lead battery may be reduced, and a charge and discharge characteristic thereof may be deteriorated. For example, due to the repetition of charging and discharging, a charging amount may be reduced, an engine's starting performance may be lowered, and a replacement cycle of the lead battery may be shortened.

According to an embodiment, the battery pack 100 may include a lithium ion battery maintaining a relatively constant charge and discharge characteristic and having less aging deterioration compared with the lead battery. Thus, the battery pack 100 may be appropriately applied to the ISG system in which stop and restart of the engine are repeated. In addition, a weight of the battery pack 100 may relatively lower than that of the lead battery having the same charge capacity. Thus, a gas mileage improvement effect may be expected. Also, the battery pack 100 may realize the same charge capacity and have a smaller size than the lead battery. Thus, a loading space may be saved.

In an implementation, the battery 101 may include various kinds of batteries. The battery 101 may have a lower rated voltage than an output voltage of the electric power generation module 120. For example, a Nickel-Metal Hydride (NiMH) battery or a nickel-cadmium battery may be used as the battery 101.

According to the present embodiment, the battery pack 100 may include the BMS 102. A lithium ion battery may have a better charge and discharge characteristic but may have lower stability than a lead battery. Thus, the battery pack 100 may include the BMS 102 so that the battery 101 may be stably charged or discharged. For example, the BMS 102 may control the battery 101 to be charged and discharged so that over-charging or over-discharging of the battery 101 may be reduced and/or prevented. For example, the BMS 102 may cut off electric power supplied to the battery 101 when the battery 101 is fully charged.

The BMS 102 may communicate with the main controller 150 through a third terminal P3 to transmit and receive various kinds of data, e.g., a charge state and a temperature, to and from the main controller 150. In addition, the BMS 102 may transmit data regarding a charge state of the battery 101 to the fan controller 132 through a fourth terminal P4. A configuration of the BMS 102 will be described in detail below with reference to FIG. 2.

The start motor 110 may operate when a vehicle is to start operating and may provide an initial rotation dynamic force for rotating a driving axis of an engine (not shown). For example, the start motor 110 may drive the engine by receiving electric power from the battery pack 100 through a first terminal P1 and a second terminal P2, and rotating the driving axis when the engine starts or when the engine restarts after an idle stop of the engine.

The electric power generation module 120 may be connected to the driving axis of the engine and may operate during operation of the engine to convert a rotation dynamic force to electric power. For example, the electric power generation module 120 may generate electric power during operation of the engine and may be, e.g., an alternator. The electric power generation module 120 may include a Direct Current (DC) or Alternating Current (AC) generator and a rectifier. In an implementation, the electric power generation module 120 may generate electric power having a voltage of about 15 V DC, e.g., about 14.4 to 14.8 V DC. The electric power generation module 120 may supply the generated electric power to desired components, e.g., the battery pack 100, the cooler 130, and/or the electric load 140.

The cooler 130 may lower a temperature of the battery pack 100 by detecting a temperature increase (according to charging and discharging of the battery pack 100) and cooling the battery pack 100. The cooler 130 may include a fan 131 (for receiving electric power and generating air flow from a rotation dynamic force) and the fan controller 132 (for controlling driving of the fan 131). In an implementation, the cooler 130 may further include a switching unit 133 (for controlling a flow of current through the fan 131).

The fan 131 may be configured so that the air flow generated by the fan 131 directly reaches the battery pack 100 or the battery 101 of the battery pack 100, thereby directly cooling the battery pack 100. In an implementation, the fan 131 may be configured so that the air flow arrives at the battery pack 100 or the battery 101 of the battery pack 100 through a duct.

According to the present embodiment, the fan controller 132 may receive data regarding a charge state of the battery 101 from the BMS 102. The fan controller 132 may drive the fan 131 based on the received data. For example, an operation of the fan controller 132 may proceed as described below.

When the charge state of the battery 101 is equal to or less than a reference value, e.g., 90%, the fan controller 132 may cut off the electric power supplied to the fan 131 by turning off the switching unit 133. When the charge state of the battery 101 is greater than the reference value, the fan controller 132 may supply the electric power to the fan 131 by turning on the switching unit 133. In this case, the fan controller 132 may adjust a rotating speed of the fan 131 based on the charge state of the battery 101. When the battery 101 is in a full charge state, the fan controller 132 may turn on the switching unit 133 and control the rotating speed of the fan 131 so that all electric power generated by the electric power generation module 120 is consumed by or directed to the fan 131.

The electric load 140 may be a component for consuming electric power stored in the battery pack 100. The electric load 140 may include various kinds of electronic devices, e.g., a navigation device, an audio device, a light, a vehicle black box, and/or a burglarproof or security device. The number and types of components forming the electric load 140 may vary according to the vehicle.

The main controller 150 may control general operations of the vehicle operating system 1 in which the battery pack 100 is installed. The main controller 150 may be connected to the battery pack 100 through the third terminal P3 to exchange various kinds of data and a control signal with the battery pack 100, to monitor a state of the battery pack 100, and to control an operation of the battery pack 100.

Figure 2:
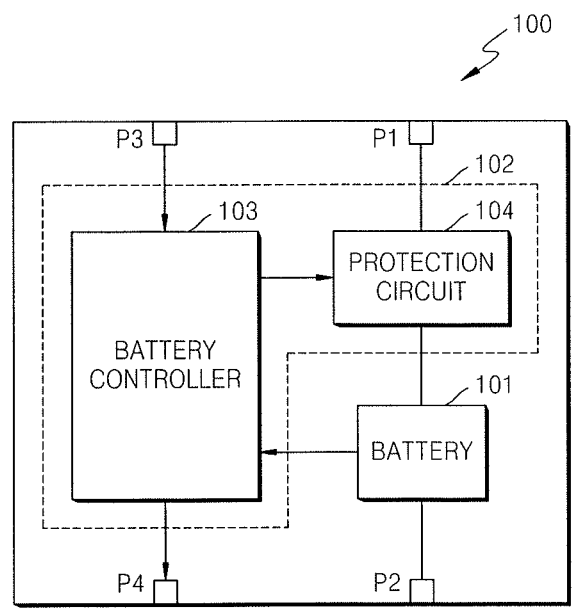
FIG. 2 illustrates a block diagram of a battery pack in the vehicle operating system of FIG. 1, according to an embodiment.

FIG. 2 illustrates a block diagram of the battery pack in the vehicle operating system of FIG. 1, according to an embodiment.

As described above, the battery pack 100 may include the battery 101, the BMS 102, and the first to fourth terminals P1 to P4. The BMS 102 may include a battery controller 103 and a protection circuit 104.

The battery controller 103 may monitor a state of the battery 101 and may transmit a monitoring result to the main controller 150. For example, the battery controller 103 may detect a plurality of types of data, such as a voltage applied to the battery 101, a current flowing through the battery 101, a temperature of the battery 101, and a charge state of the battery 101. The battery controller 103 may individually detect the data or may acquire each of the types of data by estimating the data from another one of the plurality of types of data. For example, the battery controller 103 may measure a voltage of the battery 101 to estimate the charge state or temperature of the battery 101.

The battery controller 103 may transmit the plurality of types of detected data to the main controller 150 through the third terminal P3. Then, the battery controller 103 may receive data or a control signal from the main controller 150 and may operate according to the received data or control signal.

In addition, the battery controller 103 may transmit data indicating the charge state of the battery 101 from among the plurality of types of detected data to the fan controller 132 through the fourth terminal P4. The data indicating the charge state of the battery 101 may be voltage data of the battery 101, used to estimate SOC.

The protection circuit 104 may control a flow of current towards or to the battery 101 under control of the battery controller 103. For example, when an over current flows through the battery 101, or when the battery 101 is overcharged, the battery controller 103 may control the protection circuit 104 to cut off a path of the current and, according to the control, the protection circuit 104 may turn off a switching device included therein to cut off the flow of the current.

Figure 3:
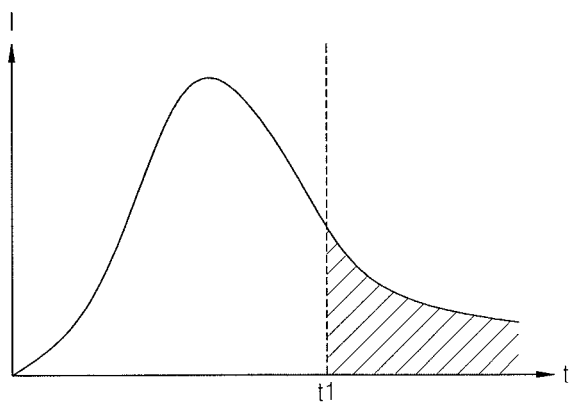
FIG. 3 illustrates a graph showing an amount of a current generated by an electric power generation module according to an embodiment.

FIG. 3 illustrates a graph showing an amount of a current generated by the electric power generation module according to an embodiment. A horizontal axis indicates a time (t), and a vertical axis indicates an amount of current (I).

Referring to FIG. 3, when the electric power generation module 120 generates electric power, a current flows through the battery pack 100. As an amount of the current increases, a charge amount of the battery 101 may also increase, and the battery 101 may be in a full charge state at time t1. However, the electric power generation module 120 may continuously generate electric power to apply the current to the battery pack 100 (a slashed part after t1). Accordingly, if electric power were to be continuously supplied to the battery 101, the battery 101 may be in an over-charge stage, and thus, deterioration, i.e., damage to the battery 101, may occur.

Figure 4:
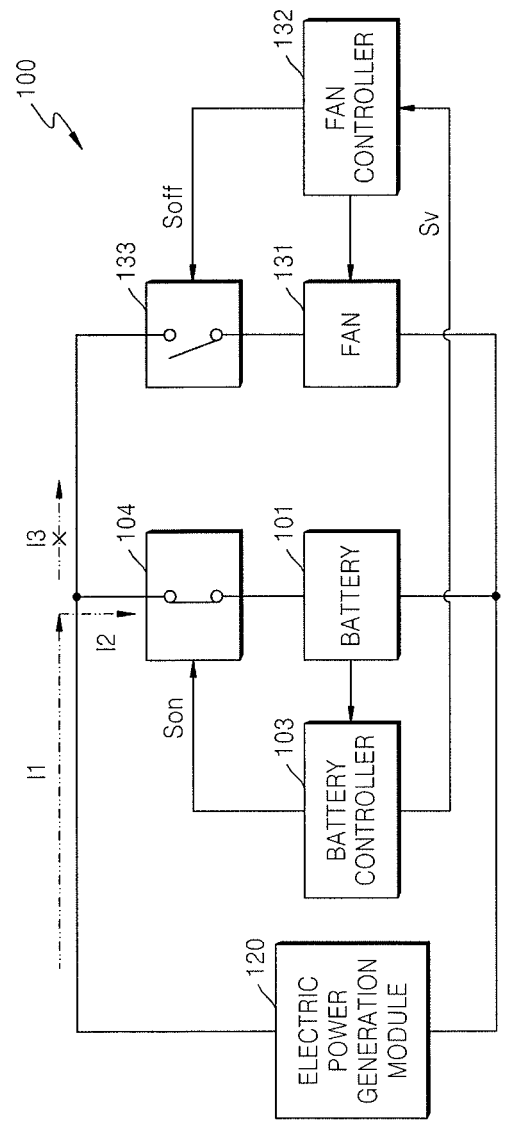
FIGS. 4 to 6 illustrate operational states of the vehicle operating system of FIG. 1, according to an embodiment.
Figure 5:
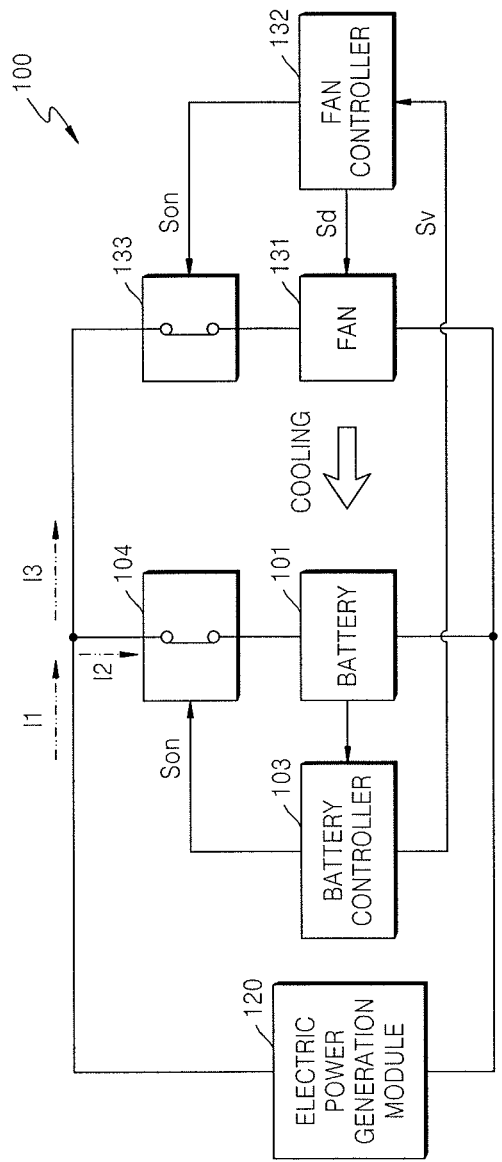
Figure 6:
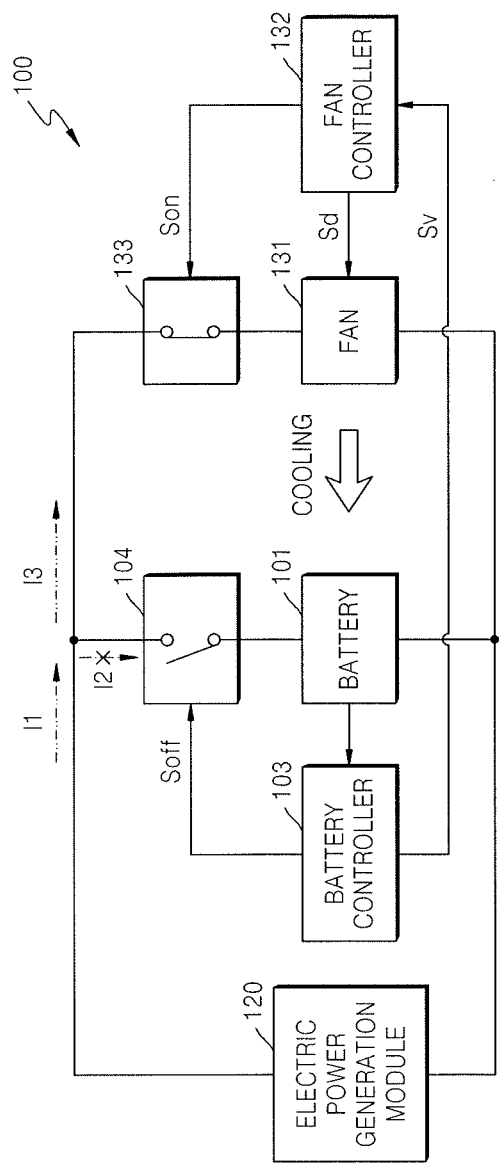

FIGS. 4 to 6 illustrate operational states of the vehicle operating system of FIG. 1, according to an embodiment. FIG. 4 illustrates a case where the battery 101 is not yet fully charged.

Referring to FIG. 4, the electric power generation module 120 may generate electric power and, accordingly, a current I1 may be generated. The generated current I1 may flow toward the battery pack 100 and the cooler 130.

The battery controller 103 may detect a charge state of the battery 101, may determine that the battery 101 needs to be charged, may generate a control signal Son (for turning on the switching device of the protection circuit 104), and may apply the control signal Son to the switching device. Accordingly, the switching device may be in a turn-on state, and a current I2 may be applied to the battery 101 to charge the battery 101. For example, when the charge state of the battery 101 is equal to or less than about 90%, the battery controller 103 may turn on the switching device to charge the battery 101.

In addition, the battery controller 103 may directly transmit data regarding a charge state of the battery 101 (i.e., data Sv regarding a voltage of the battery 101) to the fan controller 132. The fan controller 132 may determine that the battery 101 does not need to be cooled, based on the received data Sv. Thus, the fan controller 132 may apply a control signal Soff to the switching unit 133 so that the switching unit 133 is in a turn-off state, to thereby cut off a current I3 applied to the fan 131.

Accordingly, I1=I2, and I3=0. For example, the battery 101 may be charged, and the cooler 130 may not operate.

The fan controller 132 may estimate a temperature of the battery 101 based on the data regarding a charge state of the battery 101, which has been received from the battery controller 103, e.g., the data Sv regarding a voltage of the battery 101. As the voltage of the battery 101 increases, the battery may be charged for a long time. Accordingly, it may be estimated that the temperature of the battery 101 increases. Thus, when the data Sv regarding a voltage of the battery 101 (which has been received from the battery controller 103) is equal to or less than the reference value, the fan controller 132 may determine that the battery 101 does not need to be cooled. Thus, the fan controller 132 may not drive the fan 131.

FIG. 5 illustrates a case where a charge amount is greater than the reference value.

Referring to FIG. 5, the electric power generation module 120 may generate electric power and, accordingly, the current I1 may be generated. The generated current I1 may flow through the battery pack 100 and the cooler 130.

The battery controller 103 may detect a charge state of the battery 101, may determine that a charge amount is greater than the reference value, may continuously turn on the switching device of the protection circuit 104, and may allow charging of the battery 101 by allowing the current I2 to be applied to the battery 101.

The battery controller 103 may directly transmit data regarding a charge state of the battery 101 (i.e., the data Sv regarding a voltage of the battery 101) to the fan controller 132. The fan controller 132 may determine that the battery 101 needs to be cooled based on the received data Sv. Thus, the fan controller 132 may apply the control signal Son to the switching unit 133 so that the switching unit 133 is in a turn-on state to apply the current I3 to the fan 131, thereby driving the fan 131.

Accordingly, I1=I2+I3, I2≠0, and I3≠0. For example, the battery 101 may be charged and, simultaneously, the cooler 130 may be operated.

The fan controller 132 may estimate a temperature of the battery 101 based on the data Sv regarding a voltage of the battery 101, which has been received from the battery controller 103. In the instant case, the charge amount of the battery 101 may be greater than the reference value. Thus, the voltage of the battery 101 may also be greater than a reference voltage. Accordingly, it may be estimated that the temperature of the battery 101 is high. Thus, when the data Sv regarding a voltage of the battery 101 (which has been received from the battery controller 103) is greater than the reference value, the fan controller 132 may determine that the battery 101 needs to be cooled. Accordingly, the fan controller 132 may drive the fan 131.

In this case, the fan controller 132 may determine a grade of cooling based on the temperature of the battery 101. Thus, the fan controller 132 may generate a control signal Sd by determining a suitable rotating speed of the fan 131 based on the data Sv regarding a voltage of the battery 101 and may drive the fan 131 by applying the generated control signal Sd to the fan 131. For example, an amount of a current applied to the fan 131 may be adjusted to thereby adjust the rotating speed of the fan 131. Accordingly, an amount of electric power used to charge the battery pack 100 and an amount of electric power used by the cooler 130 may be determined or allocated from among the electric power generated by the electric power generation module 120.

FIG. 6 illustrates a case where the battery 101 is fully charged.

Referring to FIG. 6, the electric power generation module 120 may generate electric power and, accordingly, the current I1 may be generated. The generated current I1 may flow toward the battery pack 100 and the cooler 130.

The battery controller 103 may detect a charge state of the battery 101, may determine that the battery 101 is fully charged, may generate a control signal Soff (for turning off the switching device of the protection circuit 104), and may apply the control signal Soff to the switching device. Thus, the switching device may be in a turn-off state, and a current I2 applied to the battery may be cut off, thereby ending the charging.

The battery controller 103 may directly transmit data regarding a charge state of the battery 101 (i.e., the data Sv regarding a voltage of the battery 101) to the fan controller 132. The fan controller 132 may determine that the battery 101 needs to be cooled based on the received data Sv. Thus, the fan controller 132 may apply the current I3 to the fan 131 so that the switching unit 133 is continuously in a turn-on state to continuously rotate the fan 131.

Accordingly, I1=I3, and I2=0. For example, charging of the battery 101 may be prevented, and only the cooler 130 may operate.

The fan controller 132 may estimate a temperature of the battery 101 based on the data Sv regarding a voltage of the battery 101, which has been received from the battery controller 103. In the instant case, the battery 101 may be fully charged. Thus, the voltage of the battery 101 may be greater than the reference voltage and, accordingly, it may be estimated that the temperature of the battery 101 is high. When the data Sv regarding a voltage of the battery 101 (which has been received from the battery controller 103) is greater than the reference value, the fan controller 132 may determine that the battery 101 needs to be cooled and, accordingly, the fan controller 132 may drive the fan 131.

In this case, the temperature of the battery 101 may be maximized due to a full charge state of the battery 101. Thus, the fan 131 may operate at a maximum. In addition, if the electric power were to be supplied to the battery 101 to further charge the battery 101, the battery 101 may be deteriorated. Accordingly, the fan controller 132 may rotate the fan 131 to consume all available electric power generated by the electric power generation module 120.

Although the battery controller 103 may transmit the data Sv regarding a voltage of the battery 101 to the fan controller 132 (so that the fan controller 132 may determine the temperature of the battery 101 based on the received data Sv and may control driving/not driving and a rotating speed of the fan 131), the present embodiment is not limited thereto. For example, the vehicle operating system may be configured so that the battery controller 103 determines the temperature of the battery 101 based on the voltage of the battery 101 and applies a control signal for controlling the cooler 130 to the fan controller 132 based on a result of the determination.

Figure 7:
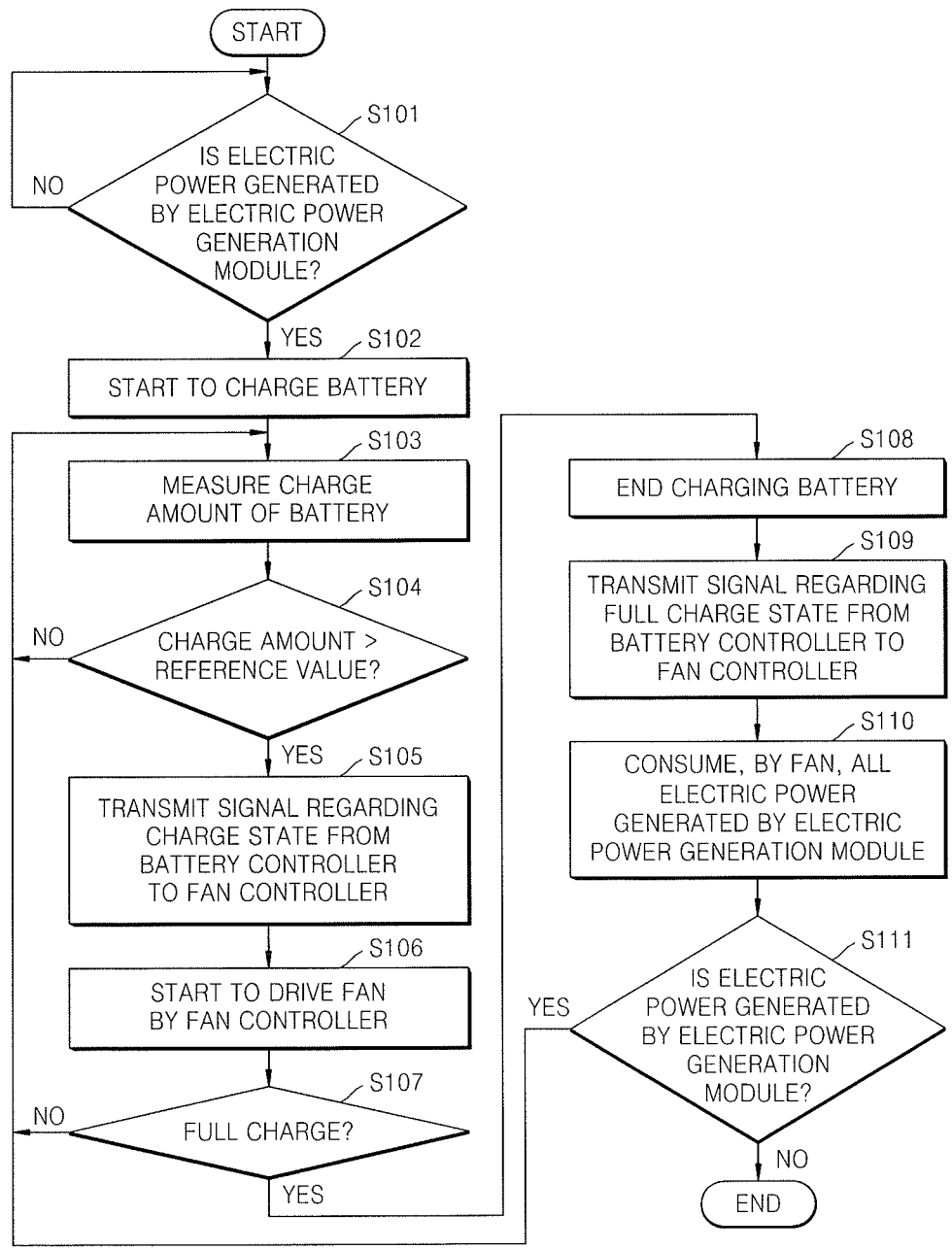
FIG. 7 illustrates a flowchart of a method of controlling the vehicle operating system of FIG. 1, according to an embodiment.

FIG. 7 illustrates a flowchart of a method of controlling the vehicle operating system of FIG. 1, according to an embodiment.

Referring to FIG. 7, in operation S101, the main controller 150 or the BMS 102 may determine whether the electric power generation module 120 is generating electric power. If the electric power generation module 120 is generating electric power, charging of the battery 101 may be started in operation S102.

In operation S103, the battery controller 103 may detect a charge state of the battery 101 and may measure a charge amount based on the detected charge state of the battery 101. In operation S104, whether the measured charge amount is greater than the reference value may be determined. If it is determined that the measured charge amount is equal to or less than the reference value, the method may proceed back to operation S103.

If it is determined that the measured charge amount is greater than the reference value, the battery controller 103 may transmit a signal regarding the charge state to the fan controller 132 in operation S105. For example, the battery controller 103 may transmit data regarding a charge state of the battery 101 (e.g., data regarding a voltage of the battery 101) to the fan controller 132.

In operation S106, the fan controller 132 may estimate that a temperature of the battery 101 is high (based on the received data regarding a voltage of the battery 101), may determine that the fan 131 needs to operate, and may start to drive the fan 131.

In operation S107, the battery controller 103 may determine whether the battery 101 is fully charged. If it is determined that the battery 101 is not fully charged, the method may proceed back to operation S103 to repeat the above-described operations. If it is determined that the battery 101 is fully charged, the battery controller 103 may turn off the switching device of the protection circuit 104 to end charging of the battery 101 in operation S108.

In operation S109, the battery controller 103 may transmit a signal regarding a full charge state of the battery 101 to the fan controller 132. For example, the battery controller 103 may transmit data regarding a voltage of the battery 101 to the fan controller 132.

The fan controller 132 may estimate that the battery 101 is fully charged and the temperature of the battery 101 is sufficiently high based on the received data. Accordingly, in operation S110, the fan controller 132 may increase a rotating speed of the fan 131 to consume all available electric power generated by the electric power generation module 120.

In operation S111, whether the electric power generation module 120 continues to generate the electric power may be determined. If it is determined that the electric power generation module 120 continues to generate the electric power, the method may proceed back to operation S103. If it is determined that the electric power generation module 120 is not generating the electric power, the method may end.

As described above, in the vehicle operating system 1 according to the present embodiment, if the battery 101 is fully charged, electric power supplied to the battery 101 may be cut off, so that charging may not be further performed. The vehicle operating system 1 may be controlled so that all the electric power generated by the electric power generation module 120 is consumed by the fan 131. Accordingly, a decrease in performance, such as deterioration of the battery 101, may be reduced and/or prevented, and stability of the battery pack 100 may be improved by cooling the battery 101.

In addition, the fan controller 132 may estimate the temperature of the battery 101 (based on the voltage of the battery 101), and adjust driving/not driving and a rotating speed of the fan 131 based on the estimated temperature. Accordingly, the temperature of the battery 101 may not need to be separately measured, thereby omitting a configuration or element for measuring the temperature of the battery 101.

Figure 8:
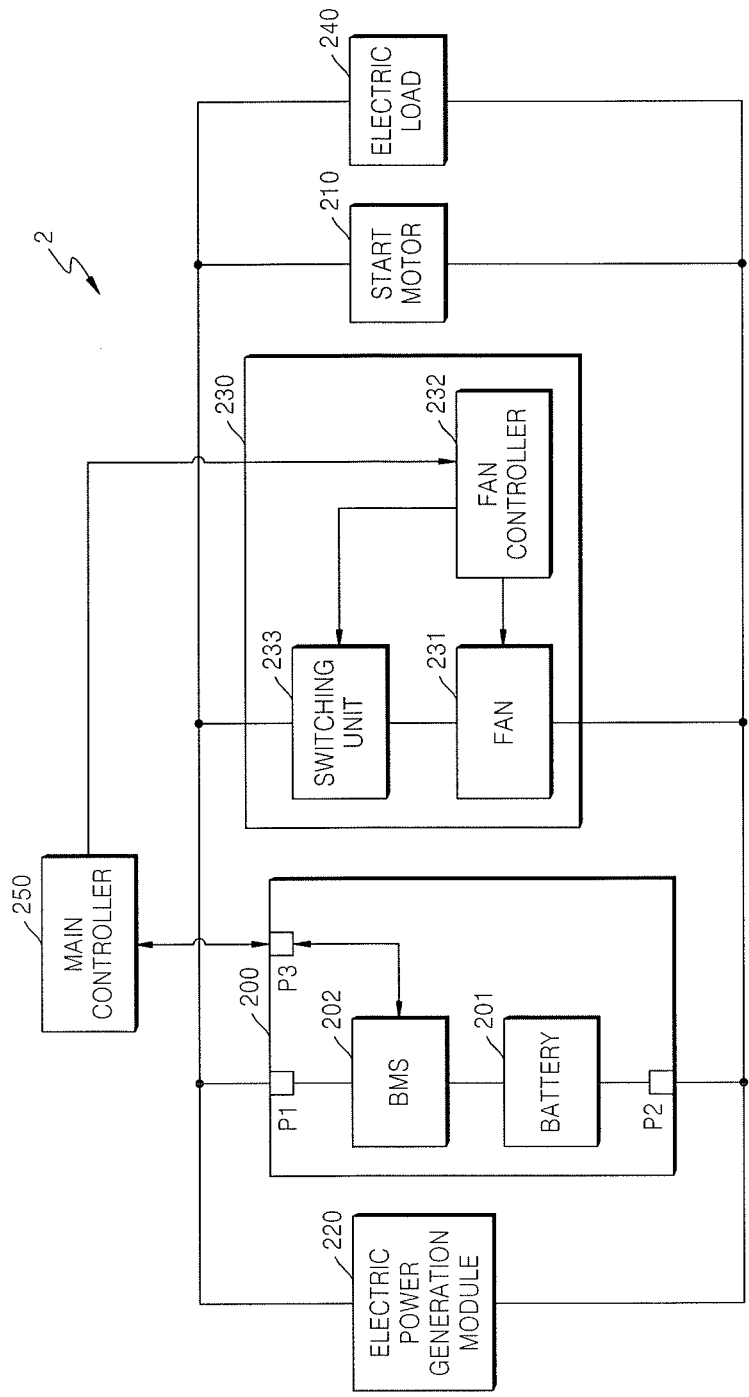
FIG. 8 illustrates a block diagram of a vehicle operating system according to an embodiment.

FIG. 8 illustrates a block diagram of a vehicle operating system=according to an embodiment. In the present embodiment, a difference from the vehicle operating system 1 of FIG. 1 is mainly described.

Referring to FIG. 8, a BMS 202 may transmit data regarding a charge state of a battery 201, e.g., data regarding a voltage of the battery 201, to a main controller 250.

The main controller 250 may transmit a control signal for directing driving/not driving of a fan 231 to a fan controller 232 based on the received data. For example, the main controller 250 may direct an operation of the fan controller 232.

The fan controller 232 may drive the fan 231 based on the direction of the main controller 250. The direction of the main controller 250 may include driving/not driving and a rotating speed of the fan 231. Alternatively, the main controller 250 may receive the data regarding a voltage of the battery 201 or temperature data (based on the data regarding a voltage of the battery 201) from the BMS 202, and the fan controller 232 may determine driving/not driving and the rotating speed of the fan 231 based on data received from the main controller 250.

As described above, in the present embodiment, the BMS 202, the fan controller 232, and the main controller 250 may be related to the data regarding a voltage of the battery 201 and the temperature estimation based on the data regarding a voltage of the battery 201.

Figure 9:
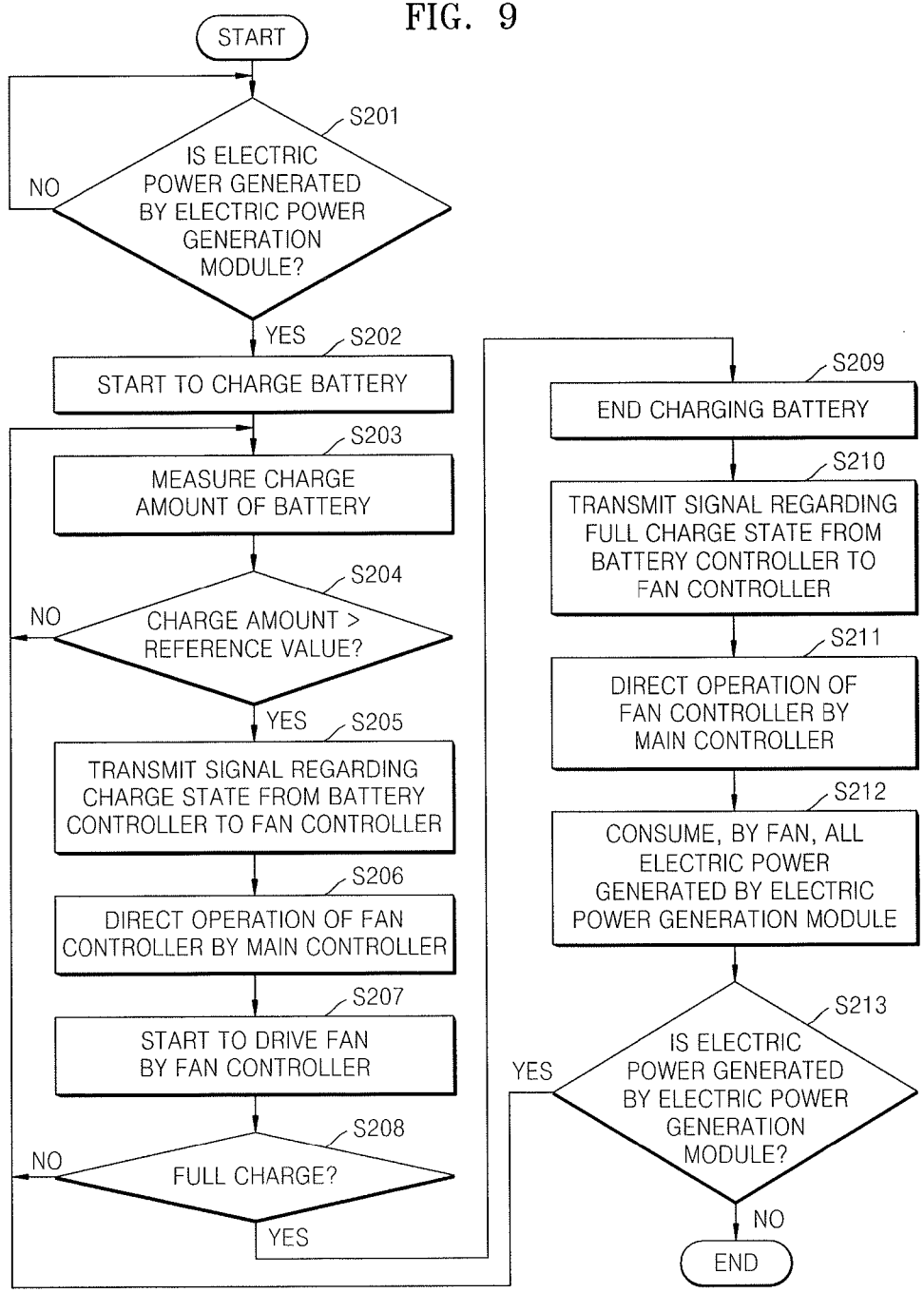
FIG. 9 illustrates a flowchart illustrating a method of controlling the vehicle operating system of FIG. 8, according to an embodiment.

FIG. 9 illustrates a flowchart of a method of controlling the vehicle operating system of FIG. 8, according to an embodiment.

Referring to FIG. 9, in operation S201, the main controller 250 or the BMS 202 may determine whether the electric power generation module 220 is generating electric power. If the electric power generation module 220 is generating electric power, charging of the battery 201 may begin in operation S202.

In operation S203, the BMS 202 may detect a charge state of the battery 201 and may measure a charge amount based on the detected charge state of the battery 201. In operation S204, whether the measured charge amount is greater than the reference value may be determined. If it is determined that the measured charge amount is equal to or less than the reference value, the method may proceed back to operation S203.

If it is determined that the measured charge amount is greater than the reference value, the BMS 202 may transmit a signal regarding the charge state to the main controller 250 in operation S205. For example, the BMS 202 may transmit data regarding a charge state of the battery 201, e.g., data regarding a voltage of the battery 201, to the main controller 250. In operation S206, the main controller 250 may transmit a control signal for directing driving/not driving of the fan 231 to the fan controller 232 based on the received data. For example, the main controller 250 may direct an operation of the fan controller 232.

In operation S207, the BMS 202 may determine whether the battery 201 is fully charged. If it is determined that battery 201 is not fully charged, the method may proceed back to operation S203 to repeat the above-described operations. If it is determined that the battery 101 is fully charged, the BMS 202 may turn off the switching device of the protection circuit 204 to end charging of the battery 201 in operation S209.

In operation S210, the BMS 202 may transmit a signal regarding a full charge state of the battery 201 to the main controller 250. For example, the BMS 202 may transmit data regarding a voltage of the battery 201 to the main controller 250. In operation 211, the main controller 250 may direct an operation of the fan controller 232 based on the received data.

The fan controller 232 may estimate whether the battery 201 is fully charged and whether the temperature of the battery 201 is sufficiently high, based on the received data. Accordingly, in operation S212, the fan controller 232 may increase a rotating speed of the fan 231 to consume all the electric power generated by the electric power generation module 220.

In operation S213, whether the electric power generation module 220 continues to generate the electric power may be determined. If it is determined that the electric power generation module 220 continues to generate the electric power, the method may proceed back to operation S203. If it is determined that the electric power generation module 220 is not generating the electric power, the method may end.

As described above, in the vehicle operating system 2 according to the present embodiment, if the battery 201 is fully charged, electric power supplied to the battery 201 may be cut off so that charging is not further performed. The vehicle operating system 2 may be controlled so that all the electric power generated by the electric power generation module 220 is consumed by the fan 231. Accordingly, a decrease in performance, such as deterioration of the battery 201, may be reduced and/or prevented, and stability of the battery pack 200 may be improved by cooling the battery 201.

In addition, the fan controller 232 may estimate the temperature of the battery 201 (based on the voltage of the battery 201), and may adjust driving/not driving and a rotating speed of the fan 231 based on the estimated temperature. Accordingly, the temperature of the battery 201 may not need to be separately measured, thereby omitting a configuration or separate element for measuring the temperature of the battery 201.

By way of summation and review, a desirable characteristic of a power supply supporting an ISG would be that the power supply robustly maintains a charge and discharge characteristic and guarantees a long life span even with frequent starting. Nonetheless, the charge and discharge characteristic of lead batteries may not be sufficient due to deterioration when used in the ISG system, thereby reducing life spans of the lead batteries.

The embodiments provide a vehicle operating system capable of properly charging a battery pack in a configuration in which charge current is supplied from an electric power generation module of a vehicle to the battery pack.

As described above, according to the embodiments, electric power generated after a battery pack is fully charged may be efficiently used, thereby providing a vehicle operating system capable of increasing stability and a life span of the battery pack.

For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members may be represented by replaceable or additional various functional connections, physical connections, or circuit connections in an actual apparatus.

For steps forming the methods according to the embodiments, if an order is not clearly disclosed or, if there is no disclosure opposed to the clear order, the steps may be performed in a proper order. The embodiments are not necessarily limited to the disclosed order of the steps. The use of all illustrations or illustrative teams (for example, and so forth, etc.) herein is simply to describe the embodiments in detail, and the scope of the embodiments is not limited due to the illustrations or illustrative terms unless they are limited by claims. In addition, it will be understood by those of ordinary skill in the art that various modifications, combinations, and changes may be formed according to design conditions and factors within the scope of the attached claims or the equivalents.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A vehicle operating system, comprising:
   an electric power generation module that is configured to generate electric power;
   a battery, the battery being chargeable by using the electric power generated by the electric power generation module;
   a battery management system that controls the chargeable battery; and
   a cooler that is configured to cool the battery,
   wherein:
   the battery management system is configured to cut off the electric power supplied to the battery when the battery is fully charged,
   when the battery management system cuts off the electric power supplied to the battery, the cooler is configured to consume the electric power generated by the electric power generation module, and
   the cooler includes a fan that cools the battery and a fan controller that controls driving of the fan, and the fan controller is configured to adjust a rotating speed of the fan based on a charge state of the battery.

2. The vehicle operating system as claimed in claim 1, further comprising a main controller that receives data related to the charge state of the battery from the battery management system and that controls the cooler based on the received data.

3. The vehicle operating system as claimed in claim 2, wherein, when the main controller receives data indicating a full charge state from the battery management system, the main controller is configured to generate a control signal for controlling the cooler based on the received data.

4. The vehicle operating system as claimed in claim 3, wherein:
   the fan controller is configured to adjust the rotating speed of the fan based on the control signal.

5. The vehicle operating system as claimed in claim 4, wherein the fan controller is configured to rotate the fan to consume all the electric power generated by the electric power generation module.

6. The vehicle operating system as claimed in claim 2, wherein the main controller receives data related to the charge state of the battery from the battery management system and is configured to generate a control signal for starting driving of the cooler when the charge state is greater than a reference value.

7. The vehicle operating system as claimed in claim 6, wherein:
   the fan controller is configured to adjust the rotating speed of the fan based on the control signal.

8. The vehicle operating system as claimed in claim 6, wherein charging the battery and driving the cooler are simultaneously performed by using the electric power generated by the electric power generation module, when the charge state of the battery is greater than the reference value and the battery is not yet fully charged.

9. The vehicle operating system as claimed in claim 2, wherein the data related to the charge state of the battery is data indicating a voltage of the battery.

10. The vehicle operating system as claimed in claim 9, wherein the main controller estimates a temperature of the battery from the data indicating the voltage of the battery and controls the cooler based on the estimated temperature.

11. The vehicle operating system as claimed in claim 1, wherein the battery management system directly transmits data indicating the charge state of the battery to the cooler.

12. The vehicle operating system as claimed in claim 11, wherein:
the fan controller is configured to adjust the rotating speed of the fan based on the data.

13. The vehicle operating system as claimed in claim 12, wherein the fan controller is configured to rotate the fan to consume all the electric power generated by the electric power generation module when the fan controller receives data indicating a full charge state from the battery management system.

14. The vehicle operating system as claimed in claim 11, wherein driving of the cooler begins when the charge state is greater than a reference value.

15. The vehicle operating system as claimed in claim 14, wherein charging the battery and driving the cooler are simultaneously performed by using the electric power generated by the electric power generation module, when the charge state of the battery is greater than the reference value and the battery is not yet fully charged.

16. The vehicle operating system as claimed in claim 11, wherein the data indicating the charge state of the battery is data indicating a voltage of the battery.

17. The vehicle operating system as claimed in claim 16, wherein the fan controller is configured to estimate a temperature of the battery from the data indicating the voltage of the battery and is configured to control the cooler based on the estimated temperature.

18. A method of controlling a vehicle operating system, the method comprising:
charging a battery by using electric power generated by an electric power generation module;
determining a charge state of the battery;
determining whether the battery is fully charged;
cutting off the electric power supplied to the battery when the battery is fully charged; and
consuming at least some of the electric power generated by the electric power generation module via a cooler that cools the battery thereby controlling operation of the cooler based on the charge state of the battery, wherein:
the cooler includes a fan that cools the battery and a fan controller that controls driving of the fan, and
the fan controller is configured to adjust a rotating speed of the fan based on the charge state of the battery.

19. The method as claimed in claim 18, wherein, when the battery is fully charged, the cooler consumes all the electric power generated by the electric power generation module.

20. The method as claimed in claim 18, wherein:
determining the charge state of the battery includes measuring a voltage of the battery, and
when the charge state of the battery is greater than the reference value, a controller allocates an amount of electric power used to charge the battery and another amount of electric power used by the cooler from among the electric power generated by the electric power generation module based on the voltage of the battery.

\* \* \* \* \*